US010339415B2

(12) United States Patent
Du

(10) Patent No.: US 10,339,415 B2
(45) Date of Patent: Jul. 2, 2019

(54) PHOTOGRAPHING METHOD AND APPARATUS AND TERMINAL

(71) Applicant: Yulong Computer Telecommunication Scientific (Shenzhen) Co., Ltd., Shenzhen, Guangdong (CN)

(72) Inventor: Lijian Du, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 276 days.

(21) Appl. No.: 15/324,575

(22) PCT Filed: Jun. 30, 2015

(86) PCT No.: PCT/CN2015/082857
§ 371 (c)(1),
(2) Date: Jan. 6, 2017

(87) PCT Pub. No.: WO2016/115832
PCT Pub. Date: Jul. 28, 2016

(65) Prior Publication Data
US 2017/0213106 A1    Jul. 27, 2017

(30) Foreign Application Priority Data
Jan. 19, 2015    (CN) .......................... 2015 1 0026519

(51) Int. Cl.
*H04N 7/18*    (2006.01)
*G06K 9/62*    (2006.01)
(Continued)

(52) U.S. Cl.
CPC ............. *G06K 9/6202* (2013.01); *G01C 3/08* (2013.01); *G01C 3/14* (2013.01); *G06T 7/74* (2017.01); *H04N 5/2258* (2013.01); *H04N 5/232* (2013.01)

(58) Field of Classification Search
CPC .......... G01C 11/06; G01C 11/00; G01C 3/08; G01C 3/14; G01S 11/12; H04N 5/23212;
(Continued)

(56) References Cited

U.S. PATENT DOCUMENTS 5,255,064 A  * 10/1993 Maekawa ............... G01S 11/12
                                                            180/167
5,640,224 A    6/1997 Omi et al.
(Continued)

FOREIGN PATENT DOCUMENTS

CN    101398593 A    4/2009
CN    102062596 A    5/2011
(Continued)

*Primary Examiner* — Gims S Philippe
(74) *Attorney, Agent, or Firm* — Young Basile Hanlon & MacFarlane, P.C.

(57) ABSTRACT

A photographing method and an apparatus include: using two photographing modules to acquire images of a to-be-photographed object at a first moment and a second moment after a preset time interval, and determining a distance of the to-be-photographed object according to image points formed by a point of the to-be-photographed object on photosensitive devices of the two photographing modules, and parameters of the two photographing modules; calculating a variation between the distances of the to-be-photographed object at the first moment and the second moment; determining whether the variation is less than or equal to a preset value; and photographing the to-be-photographed object if yes.

9 Claims, 4 Drawing Sheets

(51) Int. Cl.
  *H04N 5/232* (2006.01)
  *G06T 7/73* (2017.01)
  *G01C 3/08* (2006.01)
  *H04N 5/225* (2006.01)
  *G01C 3/14* (2006.01)

(58) Field of Classification Search
  CPC .. H04N 5/2258; G03B 17/40; B29C 47/0016;
  G06K 9/6202; G06T 7/74
  USPC ............ 382/107, 103; 396/89, 121; 425/63;
  180/167; 348/138
  See application file for complete search history.

(56) References Cited

U.S. PATENT DOCUMENTS

| | | | | |
|---|---|---|---|---|
| 5,650,224 A | * | 7/1997 | March | B29C 47/0016 425/63 |
| 6,101,336 A | * | 8/2000 | Nonaka | G03B 17/40 396/121 |
| 2008/0095402 A1 | * | 4/2008 | Kochi | G01C 11/00 382/103 |
| 2008/0219654 A1 | * | 9/2008 | Border | H04N 5/23212 396/89 |
| 2009/0135261 A1 | | 5/2009 | Imamura et al. | |
| 2009/0167877 A1 | | 7/2009 | Imamura | |
| 2016/0253822 A1 | * | 9/2016 | Li | G01C 11/06 382/107 |
| 2017/0214866 A1 | * | 7/2017 | Zhu | H04N 5/2258 |

FOREIGN PATENT DOCUMENTS

| | | |
|---|---|---|
| CN | 102158645 A | 8/2011 |
| CN | 102620713 A | 8/2012 |
| CN | 102710865 A | 10/2012 |
| CN | 104159037 A | 11/2014 |
| CN | 104580912 A | 4/2015 |
| WO | 2012036102 A | 3/2012 |

* cited by examiner

PHOTOGRAPHING METHOD AND APPARATUS AND TERMINAL

CROSS-REFERENCE TO RELATED APPLICATION(S)

This application claims priority to Chinese Patent Application No. 201510026519.1, filed with the Chinese Patent Office on Jan. 19, 2015, entitled "PHOTOGRAPHING METHOD AND APPARATUS AND TERMINAL", which is hereby incorporated by reference in its entirety.

TECHNICAL FIELD

The present disclosure relates to electronic technology filed, and particularly to a photographing method, a photographing apparatus, and a terminal.

BACKGROUND

Existing terminal remote control methods for automatic photographing mainly include following.

A first method is that a time for trigging a terminal to photograph images is set by a user. When the time arrives, the terminal is triggered to photograph images. By means of such a method, as the user cannot exactly estimate a desired time point, the time for triggering photographing is often too long or too short. When the set time is too long, waiting time increases, and when the set time is too short, the terminal may be triggered to photograph images without achieving a preset effect.

A second method is that the terminal is controlled to photograph images by way of a Bluetooth wireless transmission manner. This method needs an external device having a Bluetooth function to communicate with the terminal over Bluetooth. Setting operations of Bluetooth pairing before Bluetooth communication is cumbersome.

A third method is that the terminal is triggered to photograph images via particular speeches. For this method, if a shooting distance is too long or the environment is noisy, the recognition rate may be very bad.

The existing terminal remote control methods for automatic photographing are not perfect.

SUMMARY

The present disclosure relates to a photographing method, apparatus, and terminal, which can solve a problem of how to conveniently and accurately trigger an automatic photographing function of the terminal.

To solve the above technical problems, in the present disclosure, following technical solutions are adopted.

A photographing method comprises: using two photographing modules to acquire images of a to-be-photographed object at a first moment and a second moment after a preset time interval, and determining a distance of the to-be-photographed object according to image points formed by a point of the to-be-photographed object on photosensitive devices of the two photographing modules, and parameters of the two photographing modules; calculating a variation between the distance of the to-be-photographed object at the first moment and the distance of the to-be-photographed object at the second moment; determining whether the variation is less than or equal to a preset value; and photographing the to-be-photographed object when the variation is less than or equal to the preset value.

In some embodiments, determining the distance of the to-be-photographed object according to the image points formed by the point of the to-be-photographed object on the photosensitive devices of the two photographing modules, and the parameters of the two photographing modules comprises: determining the distance of the to-be-photographed object according to distances each from one of the image points to a center of the photosensitive device for forming the one of the image points, a distance between centers of lens of the two photographing modules, and distances each between the lens and the photosensitive device of one of the two photographing devices. Preferably, the distance of the to-be-photographed object is calculated according to a following equation: $L'=f*d/(x2-x1)$.

Wherein L' indicates the distance of the to-be-photographed object, d indicates the distance between centers of the lens of the two photographing modules, each of x2 and x1 indicates the distance from one of the image points to the center of the photosensitive device for forming the one of the image points, f indicates the distance between the lens and the photosensitive device of each of the two photographing modules.

In yet another embodiments, determining the distance of the to-be-photographed object according to the image points formed by the point of the to-be-photographed object on the photosensitive devices of the two photographing modules, and the parameters of the two photographing modules comprises: determining the distance of the to-be-photographed object according to incident angles each formed by a light and the photosensitive device of one of the two photographing modules, distances each from one of the image points to a center of the photosensitive device for forming the one of the image points, and a distance between centers of the lens of the two photographing modules, wherein the light is formed when a light from the point arrives the photosensitive device of the one of the two photographing modules after transmitting through the center of the lens of the one of the two photographing modules. Preferably, the distance of the to-be-photographed object is calculated according to a following equation: $L''=(d+x2-x1)/[1/tg(\theta 2)-1/tg(\theta 1)]$.

Wherein, L" indicates the distance of the to-be-photographed object, d indicates the distance between the centers of the lens of the two photographing modules, each of x2 and x1 indicates the distance from one of the image points to the center of the photosensitive device for forming the one of the image points, and each of θ2 and θ1 indicates an incident angle formed by a light and the photosensitive device of one of the two photographing modules, the light is formed when a light from the point arrives the photosensitive device of the one of the two photographing modules after transmitting through the center of the lens of the one of the two photographing modules.

A photographing apparatus comprises: two photographing modules configured to acquire images of a to-be-photographed object at a first moment and a second moment after a preset time interval, and further configured to photograph the to-be-photographed object when a determining module determines that a variation is less than or equal to a preset value; a distance determining module configured to determine a distance of the to-be-photographed object at the first moment according to image points formed by a point of the to-be-photographed object on photosensitive devices of the two photographing modules at the first moment, and parameters of the two photographing modules, and determine a distance of the to-be-photographed object at the second moment according to image points formed by the point of the to-be-photographed object on the photosensitive devices of the two photographing modules at the second moment, and the parameters of the two photographing modules; a calculating module configured to calculate the variation between the distance of the to-be-photographed object at the first moment and the distance of the to-be-photographed object at the second moment; and the determining module is configured to determine whether the variation calculated by the calculating module is less than or equal to the preset value.

In some embodiment, the distance determining module comprises a first determining sub-module configured to determine the distance of the to-be-photographed object according to distances each from one of the image points to a center of the photosensitive device for forming the one of the image points, a distance between centers of lens of the two photographing modules, and distances each between the lens and the photosensitive device of one of the two photographing devices. Preferably, the first determining sub-module calculates the distance of the to-be-photographed object according to a following equation: $L'=f*d/(x2-x1)$.

Wherein $L'$ indicates the distance of the to-be-photographed object, d indicates the distance between the centers of the lens of the two photographing modules, each of x2 and x1 indicates the distance from one of the image points to the center of the photosensitive device for forming the one of the image points, f indicates the distance between the lens and the photosensitive device of each of the two photographing modules.

In yet another embodiments, the distance determining module comprises a second determining sub-module configured to determine the distance of the to-be-photographed object according to incident angles each formed by a light and the photosensitive device of one of the two photographing modules, distances each from one of the image points to a center of the photosensitive device for forming the one of the image points, and a distance between centers of the lens of the two photographing modules, and the light is formed when a light from the point arrives the photosensitive device of the one of the two photographing modules after transmitting through the center of the lens of the one of the two photographing modules. Preferably, the second determining sub-module is configured to calculate the distance of the to-be-photographed object according to a following equation: $L''+(d+x2-x1)/[1/tg(\theta2)-1/tg(\theta1)]$.

Wherein, $L''$ indicates the distance of the to-be-photographed object, d indicates the distance between the centers of the lens of the two photographing modules, each of x2 and x1 indicates the distance from one of the image points to the center of the photosensitive device for forming the one of the image points, and each of $\theta2$ and $\theta1$ indicates an incident angle formed by a light and the photosensitive device of one of the two photographing modules, the light is formed when a light from the point arrives the photosensitive device of the one of the two photographing modules after transmitting through the center of the lens of the one of the two photographing modules.

A terminal comprises: a memory storing a set of program codes; two photographing modules; and a processor configured to invoke the set of program codes stored in the memory to execute following operations: using two photographing modules to acquire images of a to-be-photographed object at a first moment and a second moment after a preset time interval, and determining a distance of the to-be-photographed object according to image points formed by a point of the to-be-photographed object on photosensitive devices of the two photographing modules, and parameters of the two photographing modules; calculating a variation between the distance of the to-be-photographed object at the first moment and the distance of the to-be-photographed object at the second moment; determining whether the variation is less than or equal to a preset value; and photographing the to-be-photographed object when the variation is less than or equal to the preset value.

In some embodiments, the processor being configured to determine the distance of the to-be-photographed object according to the image points formed by the point of the to-be-photographed object on the photosensitive devices of the two photographing modules, and the parameters of the two photographing modules comprises: determining the distance of the to-be-photographed object according to distances each from one of the image points to a center of the photosensitive device for forming the one of the image points, a distance between centers of lens of the two photographing modules, and distances each between the lens and the photosensitive device of one of the two photographing devices.

Wherein, the processor is configured to calculate the distance of the to-be-photographed object according to a following equation: $L'=f*d/(x2-x1)$.

Wherein $L'$ indicates the distance of the to-be-photographed object, d indicates the distance between the centers of the lens of the two photographing modules, each of x2 and x1 indicates the distance from one of the image points to the center of the photosensitive device for forming the one of the image points, f indicates the distance between the lens and the photosensitive device of each of the two photographing modules.

In yet another embodiments, the processor being configured to determine the distance of the to-be-photographed object according to the image points formed by the point of the to-be-photographed object on the photosensitive devices of the two photographing modules, and the parameters of the two photographing modules comprises: determining the distance of the to-be-photographed object according to incident angles each formed by a light and the photosensitive device of one of the two photographing modules, distances each from one of the image points to a center of the photosensitive device for forming the one of the image points, and a distance between centers of the lens of the two photographing modules, and the light is formed when a light from the point arrives the photosensitive device of the one of the two photographing modules after transmitting through the center of the lens of the one of the two photographing modules.

Wherein, the processor is configured to obtain the distance of the to-be-photographed object according to a following equation: $L''=(d+x2-x1)[1/tg(\theta2)-1/tg(\theta1)]$.

Wherein, $L''$ indicates the distance of the to-be-photographed object, d indicates the distance between the centers of the lens of the two photographing modules, each of x2 and x1 indicates the distance from one of the image points to the center of the photosensitive device for forming the one of the image points, and each of $\theta2$ and $\theta1$ indicates an incident angle formed by a light and the photosensitive device of one of the two photographing modules, the light is formed when a light from the point arrives the photosensitive device of the one of the two photographing modules after transmitting through the center of the lens of the one of the two photographing modules.

As in reality a moment for triggering automatic photographing is that when the distance of a to-be-photographed object stays unchanged or a change of the distance of the to-be-photographed object is very little, for the photographing method, apparatus, and terminal of the present disclosure, image acquisition functions of two photographing modules are used to calculate the distance of the to-be-photographed object, and then a variation between the distances at two subsequent moments is calculated. When the variation is less than or equal to a preset value, the automatic photographing is triggered. The present disclosure uses two photographing modules to perform distance measurement, and automatic photographing is realized according to motion states of a user, thus the operation is simple, user requirement can be satisfied, and user experience can be improved.

DETAILED DESCRIPTION

To provide a convenient and accurate solution for triggering an automatic photographing function, the present disclosure proposes a conception that for an apparatus having at least two photographing devices, a distance of a to-be-photographed object is measured by use of image acquisition functions of the two photographing modules, and then a variation between the distances at subsequent moments is calculated. When the variation is less than or equal to a preset value, automatic photographing is triggered.

Each of the two photographing modules used for image acquisition at least includes a lens and a photosensitive device. An incident light from a point of the to-be-photographed object is focused by the lens to arrive the photosensitive device, such that an image point is formed on the photosensitive device. The incident light and the photosensitive device cooperatively form an incident angle, and a straight line which passes through a center of the lens and is perpendicular to a plane of the lens is an optical axis of the lens. During a manufacturing process of the photographing module, it can be ensured that the optical axis of the lens is perpendicular to a plane of the photosensitive device. After manufacturing, parameters of each photographing module are known. The parameters can include but not limited to the center of the lens, a center of the photosensitive device, and a distance between the lens and the photosensitive device (focus). The focuses of the two photographing modules are the same. During a process of mounting the two photographing modules, it can be ensured that the lenses of the two photographing modules are on the same plane. As the focuses are the same, the photosensitive devices are also on the same plane, and a distance between the centers of the two lenses is known. Preferably, at a first moment and a second moment after a preset time interval, the two photographing modules simultaneously acquire images.

In the present disclosure, the distance of the to-be-photographed object refers a vertical distance from the to-be-photographed object to one of the two photographing modules, which includes but not limited to following two distances: a vertical distance from the to-be-photographed object to the lens of one of the two photographing modules, and a vertical distance from the to-be-photographed object to the photosensitive device of one of the two photographing modules.

The following will specifically describe the present disclosure in combination with specific embodiments and the accompanying drawings.

Figure 1:
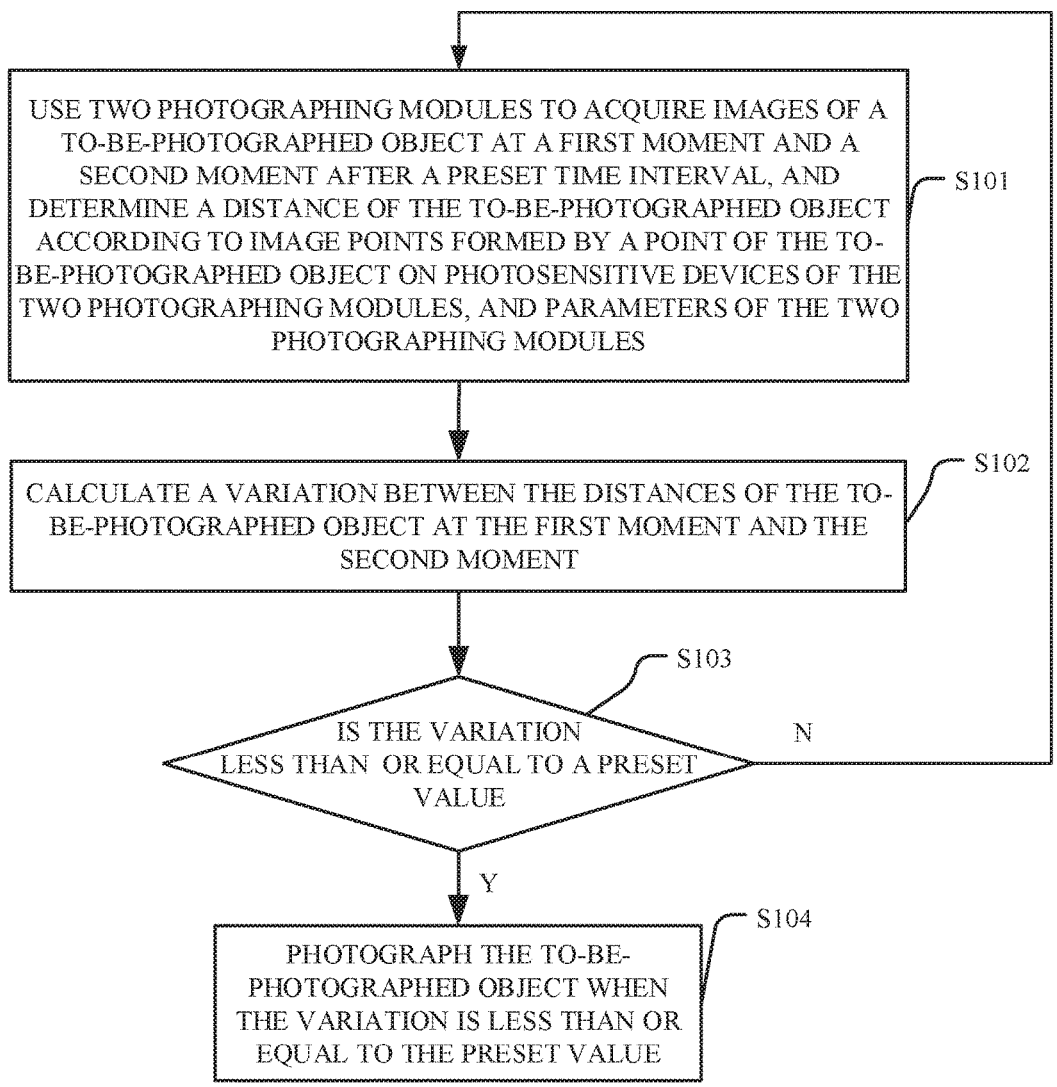
FIG. 1 is a flow chart of a photographing method in accordance with an embodiment of the present disclosure.

FIG. 1 is a flow chart of a photographing method in accordance with an embodiment of the present disclosure. Referring to FIG. 1, the method includes following.

S101, two photographing modules are used to acquire images of a to-be-photographed object at a first moment and a second moment after a preset time interval, and a distance of the to-be-photographed object is determined according to image points formed by a point of the to-be-photographed object on photosensitive devices of the two photographing modules and parameters of the two photographing modules. Preferably, at the two moments, the two photographing modules simultaneously acquire images.

A purpose of this step is to determine the distances of the to-be-photographed object at the first moment and the second moment. At each moment, the two photographing devices simultaneously acquire images of the to-be-photographed object, and then the distance of the to-be-photographed object is determined according to the image points formed by the point of the to-be-photographed object on the photosensitive devices of the two photographing modules and the parameters of the two photographing modules.

A number of detailed solutions for determining the distances can be used, and the solutions include but not limited to following two solutions.

S101a, the distance of the to-be-photographed object is determined according to distances each from one of the image points to a center of the photosensitive device for forming the one of the image points, a distance between centers of the lenses of the two photographing modules, and distances each between the lens and the photosensitive device of one of the photographing modules.

Figure 2:
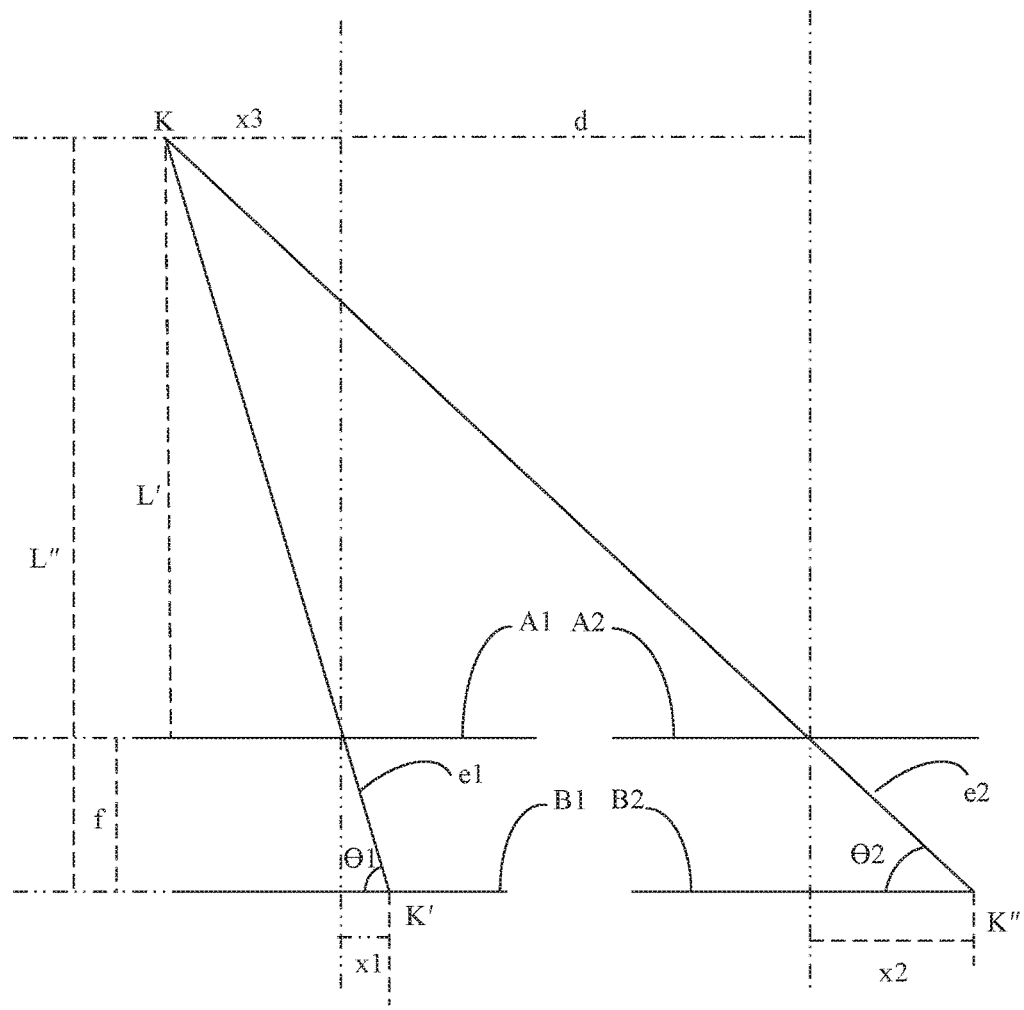
FIG. 2 is a schematic view showing that photographing modules acquire lights from an object in accordance with an embodiment of the present disclosure.

As shown in FIG. 2, if a first photographing module includes a first lens A1 and a first photosensitive device B1, and a first optical axis C1 of the first lens A1 is perpendicular to a plane of the first lens A1 and a plane of the first photosensitive device B1, a first incident light e1 from a K point of the to-be-photographed object transmits thorough a center of the second lens A1, and a first image point K' is formed on the first photosensitive device B1. An included angle formed by the first incident line e1 and the first photosensitive device B1 is a first incident angle $\theta 1$. A second photographing module includes a second lens A2 and a second photosensitive device B2, and a second optical axis C2 of the second lens A2 is perpendicular to a plane of the second lens A2 and a plane of the second photosensitive device B2. A second incident light e2 from the K point of the to-be-photographed object transmits through a center of the second lens A2, and a second image point is formed on the second photosensitive device B2. An included angle formed by the second incident line e2 and the second photosensitive device B2 is a second incident angle $\theta 2$. The first optical axis C1 is parallel to the second optical axis C2, and f indicates a distance between the first lens A1 and the first photosensitive device B1. The distance between the first lens A1 and the first photosensitive device B1 is the same as that between the second lens A2 and the second photosensitive device B2, thus f also indicates the distance between the second lens A2 and the second photosensitive device B2. d indicates a distance between centers of the first lens A1 and the second lens A2, and L' indicates a vertical distance from the K point to the first photosensitive device B1, and a vertical distance from the K point to the second photosensitive device B2. L" equals to a sum of L' and f, x1 indicates a distance from the first image point K' to the center of the first photosensitive device B1, x2 indicates a distance from the second image point to the center of the second photosensitive device B2, and a distance from the K point to the center of the first lens A1 is x3.

Therefore following equations (1) and (2) are obtained.

$$x1/f=x3/L' \qquad (1).$$

$$x2/f=(x3+d)/L' \qquad (2).$$

When the equations (1) and (2) are combined, a value of L' can be obtained.

$$L'=f*d/(x2-x1) \qquad (3)$$

As the distance d between the centers of the first lens A1 and the second lens A2, the distance f between the first lens A1 and the first photosensitive device B1 (the distance f is also the distance between the second lens A2 and the second photosensitive device B2), the distance x1 from the first image point K' to the center of the first photosensitive device B1, and the distance x2 from the second image point K" to the second photosensitive device B2 are known, thus L' can be determined. L' indicates the vertical distance from the K point to the first lens A1, and the vertical distance from the K point to the second lens A2, and also indicates the vertical distance from the to-be-photographed object to the first lens A1, and the vertical distance from the to-be-photographed object to the second lens A2. If the vertical distance L" from the to-be-photographed object to the first photosensitive device B1 or to the second photosensitive device B2 needs to be obtained, L" can be obtained by adding f to L'.

Therefore, the equation (3) can be used to determine that the distance of the to-be-photographed object can be determined by step S101a.

In actual use, the equation (3) can be written into software. By using the equation, the distance of the to-be-photographed object can be calculated.

S101b, the distance of the to-be-photographed object is determined according to incident angles each formed by a light and the photosensitive device of one of the two photographing modules, distances each between one of the image points and the photosensitive device for forming the one of the image points, and a distance between the centers of the lens of the two photographing modules, and the light is formed when a light from the point of the to-be-photographed object arrives the photosensitive device of the one of the two photographing modules after transmitting through the center of the lens of the one of the two photographing modules.

Based on the schematic view of FIG. 2, following equations can be obtained according to definition of trigonometric functions.

$$tg(\theta1)=f/x1 \qquad (4)$$

$$tg(\theta2)=f/x2 \qquad (5)$$

$$x3+x1=L''/tg(\theta1) \qquad (6)$$

$$x3+d+x2=L''/tg(\theta2) \qquad (7)$$

When the equations (6) and (7) are combined, an equation (8) is obtained.

$$x3+d+x2-(x3+x1)=L''/tg(\theta2)-L''/tg(\theta1) \qquad (8)$$

Thus $d+x2-x1=L''*[1/tg(\theta2)-1/tg(\theta1)] \qquad (9)$

Thus $L''=(d+x2-x1)/[1/tg(\theta2)-1/tg(\theta1)] \qquad (10)$

As the distance d between the centers of the first lens A1 and the second lens A2, the distance x1 from the first image point K' to the center of the first photosensitive device B1, the distance x2 from the second image point K" to the center of the second photosensitive device B2, the first incident angle $\theta1$, and the second incident angle $\theta2$ are known, thus L" can be determined. L" indicates the vertical distance from the K point to the first photosensitive device B1, and the vertical distance from the K point to the second photosensitive device B2, and can also indicate the vertical distance from the to-be-photographed object to the first photosensitive device B1, and the vertical distance from the to-be-photographed object to the second photosensitive device B2. If the vertical distance L' from the to-be-photographed object to the first lens A1 or the second lens 2 needs to be obtained, L' can be obtained by subtracting f from L". The distance f between the first lens A1 and the first photosensitive device B1 (the distance f is also the distance between the second optical lens A2 and the second photosensitive device B2) is also known.

After the distance at the first moment and the distance at the second moment are determined, step S102 can be executed.

S102, a variation between the distance of the to-be-photographed object at the first moment and the distance of the to-be-photographed object at the second moment is calculated. The variation is an absolute value.

S103, whether the variation is less than or equal to a preset value is determined. If yes, step S104 is executed, otherwise the procedure returns to step S101 to determine the distance of the to-be-photographed object at a next moment.

If the variation is less than or equal to the preset value, it indicates that at the first moment and the second moment, the distance of the to-be-photographed object stays unchanged or the change of the distance of the to-be-photographed object is very small, thus the automatic photographing function can be triggered.

S104, the to-be-photographed object is photographed.

Figure 3:
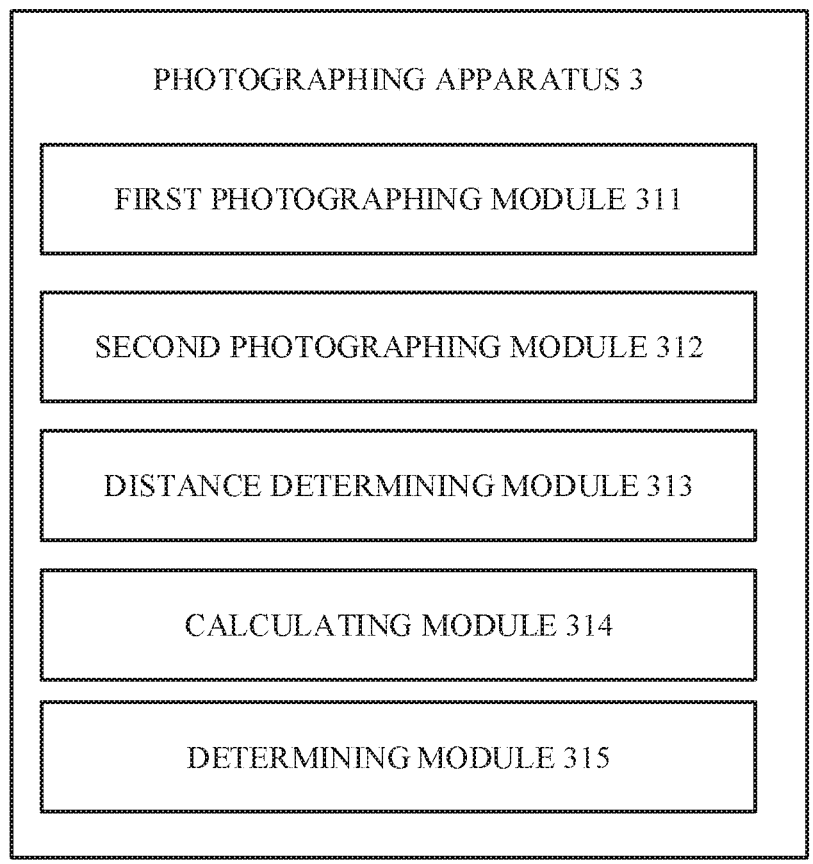
FIG. 3 is a schematic view of a photographing apparatus in accordance with an embodiment of the present disclosure.

FIG. 3 is a schematic view of a photographing apparatus in accordance with an embodiment of the present disclosure. As shown in FIG. 3, the photographing device 3 includes two photographing modules (a first photographing module 311 and a second photographing module 312), a distance determining module 313, a calculating module 314, and a determining module 315.

The two photographing modules are configured to acquire images of a to-be-photographed object at a first moment and a second moment after a preset time interval, and further configured to photograph the to-be-photographed object when the determining module 315 determines that a variation is less than or equal to a preset value.

The distance determining module 313 is configured to determine a distance of the to-be-photographed object at the first moment according to image points formed by a point of the to-be-photographed object on photosensitive devices of the two photographing modules (the first photographing module 311 and the second photographing module 312) at the first moment, and parameters of the two photographing modules (the first photographing module 311 and the second photographing module 312), and determine a distance of the to-be-photographed object at the second moment according to image points formed by the point of the to-be-photographed object on the photosensitive devices of the two photographing modules (the first photographing module 311 and the second photographing module 312) at the second moment, and the parameters of the two photographing modules (the first photographing module 311 and the second photographing module 312).

A calculating module 314 is configured to calculate the variation between the distance of the to-be-photographed object at the first moment and the distance of the to-be-photographed object at the second moment The determining module 315 is configured to determine whether the variation calculated by the calculating module 314 is less than or equal to the preset value.

In some embodiments, the distance determining module 313 includes a first determining sub-module configured to determine the distance of the to-be-photographed object according to distances each from one of the image points to a center of the photosensitive device for forming the one of the image points, a distance between centers of lens of the two photographing modules (the first photographing module 311 and the second photographing module 312), and distances each between the lens and the photosensitive device of one of the two photographing modules (the first photographing module 311 and the second photographing module 312).

Preferably, the first determining sub-module is configured to calculate the distance of the to-be-photographed object according to a following equation: $L=f*d/(x2-x1)$.

Wherein, L' indicates the distance of the to-be-photographed object, d indicates a distance between centers of the lens of the two photographing modules (the first photographing module 311 and the second photographing module 312), each of x2 and x1 indicates a distance from one of the image points to the center of the photosensitive device for forming the one of the image points, and f indicates a distance between the lens and the photosensitive device of one of the two photographing modules (the first photographing module 311 and the second photographing module 312).

In yet another embodiments, the distance determining module 313 includes a second determining sub-module configured to determine the distance of the to-be-photographed object according to incident angles each formed by a light and the photosensitive device of one of the two photographing modules, distances each from one of the image points to a center of the photosensitive device for forming the one of the image points, and a distance between centers of the lens of the two photographing modules, and the light is formed when a light from the point arrives the photosensitive device of the one of the two photographing modules after transmitting through a center of the lens of the one of the two photographing modules.

Preferably, the second determining sub-module is configured to calculate the distance of the to-be-photographed object according to a following equation: $L''=(d-x2-x1)/[1/tg(\theta2)-1/tg(\theta1)]$.

Wherein, L" indicates the distance of the to-be-photographed object, d indicates the distance between the centers of the lens of the two photographing modules (the first photographing module 311 and the second photographing module 312), each of x2 and x1 indicates the distance from one of the image points to the center of the photosensitive device for forming the one of the image points, and each of $\theta2$ and $\theta1$ indicates an incident angle formed by a light and the photosensitive device of one of the two photographing modules (the first photographing module 311 and the second photographing module 312), and the light is formed when a light from the point arrives the photosensitive device of the one of the two photographing modules (the first photographing module 311 and the second photographing module 312) after transmitting through the center of the lens of the one of the two photographing modules (the first photographing module 311 and the second photographing module 312).

Figure 4:
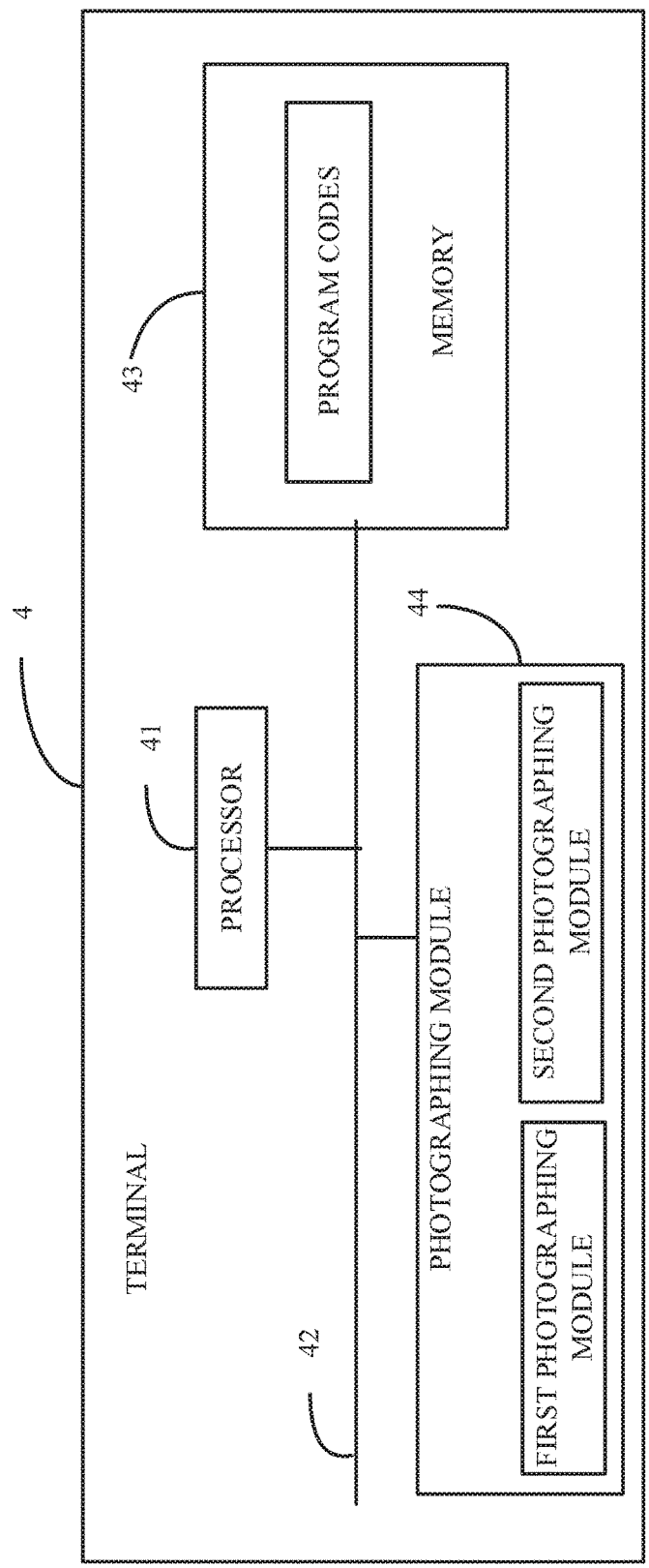
FIG. 4 is a schematic view of a terminal in accordance with an embodiment of the present disclosure.

FIG. 4 is a schematic view of a terminal in accordance with an embodiment of the present disclosure. The terminal can include but not limited to a mobile phone. As shown in FIG. 4, the terminal 4 can include at least one processor 41 (for example, CPU), at least one communication bus 42, a memory 43, and two photographing modules 44. The communication bus 42 is configured to realize communication among these components. The memory 43 can be a high speed random-access memory, and can also be a non-volatile memory, for example, at least one disc memory. A set of program codes is stored in the memory 43. The processor 41 invokes the set of program codes stored in the memory 43 to execute following operations: using the two photographing modules 44 to acquire images of a to-be-photographed object at a first moment and a second moment after a preset time interval, and determining a distance of the to-be-photographed object according to image points formed by a point of the to-be-photographed object on photosensitive devices of the two photographing modules 44, and parameters of the two photographing modules 44; calculating a variation between the distance of the to-be-photographed object at the first moment and the distance of the to-be-photographed object at the second moment; determining whether the variation is less than or equal to a preset value; and photographing the to-be-photographed object when the variation is less than or equal to the preset value.

In some embodiment, the processor 41 being configured to determine the distance of the to-be-photographed object according to the image points formed by the point of the to-be-photographed object on the photosensitive devices of the two photographing modules 44, and the parameters of the two photographing modules 44 includes: determining the distance of the to-be-photographed object according to distances each from one of the image points to a center of the photosensitive device for forming the one of the image points, a distance between centers of lens of the two photographing modules 44, and distances each between the lens and the photosensitive device of one of the two photographing devices 44.

Wherein, the processor 41 is configured to calculate the distance of the to-be-photographed object according to a following equation: $L'=f*d/(x2-x1)$.

Wherein L' indicates the distance of the to-be-photographed object, d indicates a distance between centers of the lens of the two photographing modules 44, each of x2 and x1 indicates a distance from one of the image points to the center of the photosensitive device for forming the one of the image points, f indicates a distance between the lens and the photosensitive device of one of the two photographing modules 44.

In yet another embodiment, the processor 41 being configured to determine the distance of the to-be-photographed object according to the image points formed by the point of the to-be-photographed object on the photosensitive devices of the two photographing modules 44, and the parameters of the two photographing modules 44 includes: determining the distance of the to-be-photographed object according to incident angles each formed by a light and the photosensitive device of one of the two photographing modules 44, distances each from one of the image points to a center of the photosensitive device for forming the one of the image points, and a distance between centers of the lens of the two photographing modules 44, wherein the light is formed when a light from the point arrives the photosensitive device of the one of the two photographing modules after transmitting through the center of the lens of the one of the two photographing modules 44.

Wherein, the processor 41 is configured to calculate the distance of the to-be-photographed object according to a following equation: $L''=(d+x2-x1)/[1/tg(\theta 2)-1/tg(\theta 1)]$.

Wherein, L" indicates the distance of the to-be-photographed object, d indicates the distance between the centers of the lens of the two photographing modules 44, each of x2 and x1 indicates the distance from one of the image points to the center of the photosensitive device for forming the one of the image points, and each of θ2 and θ1 indicates an incident angle formed by a light and the photosensitive device of the one of the two photographing modules 44, wherein the light is formed when a light from the point arrives the photosensitive device of the one of the two photographing modules after transmitting through the center of the lens of the one of the two photographing modules 44.

The present disclosure uses two photographing modules to perform distance measurement, and automatic photographing can be realized according to motion status of a user, thus the operation is simple, user requirements can be satisfied, and user experience can be improved.

The foregoing descriptions further specifically illustrate the present disclosure in combination with detailed embodiments, and it cannot be maintained that the detailed embodiments are limited to the illustration. For those skilled in the art of the present disclosure, without departing from the principle of the present disclosure, simple deductions or substitutions can be made, and the deductions or substitutions should be deemed to fall into the protection scope of the present disclosure.

What is claimed is:

1. A photographing method comprising:
   using two photographing modules to acquire images of a to-be-photographed object at a first moment and a second moment after a preset time interval, and determining a distance of the to-be-photographed object according to:
     a distance from an image point to a center of a photosensitive device of each of the two photographing modules, wherein image points are formed by a point of the to-be-photographed object on the photosensitive devices of the two photographing modules;
     a distance between centers of lenses of the two photographing modules; and
     one of a distance between the lens and the photosensitive device of each of the two photographing modules and an incident angle formed by a light and the photosensitive device of each of the two photographing modules;
   calculating a variation between the distance of the to-be-photographed object at the first moment and the distance of the to-be-photographed object at the second moment;
   determining whether the variation is less than or equal to a preset value; and
   photographing the to-be-photographed object when the variation is less than or equal to the preset value.

2. The photographing method of claim 1, wherein when determining the distance of the to-be-photographed object according to the distance from the image point to the center of the photosensitive device of each of the two photographing modules, the distance between the centers of the lenses of the two photographing modules, and the distance between the lens and the photosensitive device of each of the two photographing modules, the distance of the to-be-photographed object is calculated according to a following equation:

$$L'=f*d/(x2-x1);$$

wherein L' indicates the distance of the to-be-photographed object, d indicates the distance between the centers of the lenses of the two photographing modules, each of x2 and x1 indicates the distance from one of the image points to the center of the photosensitive device for forming the one of the image points, f indicates the distance between the lens and the photosensitive device of one of the two photographing modules.

3. The photographing method of claim 1, wherein when determining the distance of the to-be-photographed object according to the distance from the image point to the center of the photosensitive device of each of the two photographing modules, the distance between the centers of the lenses of the two photographing modules, and the incident angle formed by the light and the photosensitive device of each of the two photographing modules, the distance of the to-be-photographed object is obtained according to a following equation:

$$L''=(d+x2-x1)/[1/tg(\theta 2)-1/tg(\theta 1)];$$

wherein, L" indicates the distance of the to-be-photographed object, d indicates the distance between the centers of the lenses of the two photographing modules, each of x2 and x1 indicates the distance from one of the image points to the center of the photosensitive device for forming the one of the image points, and each of θ2 and θ1 indicates an incident angle formed by a light and the photosensitive device of one of the two photographing modules, and the light is formed when a light from the point arrives the photosensitive device of the one of the two photographing modules after transmitting through the center of the lens of the one of the two photographing modules.

4. A photographing apparatus comprising:
   two photographing modules configured to acquire images of a to-be-photographed object at a first moment and a second moment after a preset time interval;
   a distance determining module configured to determine a distance of the to-be-photographed object according to:
     a distance from an image point to a center of a photosensitive device of each of the two photographing modules, wherein image points are formed by a point of the to-be-photographed object on the photosensitive devices of the two photographing modules;
     a distance between centers of lenses of the two photographing modules; and
     one of a distance between the lens and the photosensitive device of each of the two photographing modules and an incident angle formed by a light and the photosensitive device of each of the two photographing modules;
   a calculating module configured to calculate a variation between the distance of the to-be-photographed object at the first moment and the distance of the to-be-photographed object at the second moment; and
   a determining module is configured to determine whether the variation is less than or equal to a preset value;
   wherein the two photographing modules are further configured to photograph the to-be-photographed object when the determining module determines that the variation is less than or equal to the preset value.

5. The photographing apparatus of claim 4, wherein the distance determining module configured to the distance from the image point to the center of the photosensitive device of each of the two photographing modules, the distance between the centers of the lenses of the two photographing modules, and the distance between the lens and the photosensitive device of each of the two photographing modules is configured to calculate the distance of the to-be-photographed object according to a following equation:

$$L''=f*d/(x2-x1);$$

wherein L" indicates the distance of the to-be-photographed object, d indicates the distance between the centers of the lenses of the two photographing modules, each of x2 and x1 indicates the distance from one of the image points to the center of the photosensitive device for forming the one of the image points, and f indicates the distance between the lens and the photosensitive device of one of the two photographing modules.

6. The photographing apparatus of claim 4, wherein the distance determining module configured to the distance from the image point to the center of the photosensitive device of each of the two photographing modules, the distance between the centers of the lenses of the two photographing modules, and the incident angle formed by the light and the photosensitive device of each of the two photographing modules is configured to calculate the distance of the to-be-photographed object according to a following equation:

$$L''=(d+x2-x1)/[1/tg(\theta 2)-1/tg(\theta 1)];$$

wherein, L" indicates the distance of the to-be-photographed object, d indicates the distance between the centers of the lenses of the two photographing modules, each of x2 and x1 indicates the distance from one of the image points to the center of the photosensitive device for forming the one of the image points, and each of $\theta 2$ and $\theta 1$ indicates an incident angle formed by a light and the photosensitive device of one of the two photographing modules, and the light is formed when a light from the point arrives the photosensitive device of the one of the two photographing modules after transmitting through the center of the lens of the one of the two photographing modules.

7. A terminal comprising:
a memory storing a set of program codes;
two photographing modules; and
a processor configured to invoke the set of program codes stored in the memory to execute following operations:
using the two photographing modules to acquire images of a to-be-photographed object at a first moment and a second moment after a preset time interval, and determining a distance of the to-be-photographed object according to:
a distance from an image point to a center of a photosensitive device of each of the two photographing modules, wherein image points are formed by a point of the to-be-photographed object on the photosensitive devices of the two photographing modules;
a distance between centers of lenses of the two photographing modules; and one of a distance between the lens and the photosensitive device of each of the two photographing modules and an incident angle formed by a light and the photosensitive device of each of the two photographing modules;
calculating a variation between the distance of the to-be-photographed object at the first moment and the distance of the to-be-photographed object at the second moment;
determining whether the variation is less than or equal to a preset value; and
photographing the to-be-photographed object when the variation is less than or equal to the preset value.

8. The terminal of claim 7, wherein the processor being configured to determine the distance of the to-be-photographed object according to the distance from the image point to the center of the photosensitive device of each of the two photographing modules, the distance between the centers of the lenses of the two photographing modules, and the distance between the lens and the photosensitive device of each of the two photographing modules is configured to calculate the distance of the to-be-photographed object according to a following equation:

$$L'=f*d/(x2-x1);$$

wherein L' indicates the distance of the to-be-photographed object, d indicates the distance between the centers of the lenses of the two photographing modules, each of x2 and x1 indicates the distance from the one of the image points to the center of the photosensitive device for forming the one of the image points, and f indicates the distance between the lens and the photosensitive device of one of the two photographing modules.

9. The terminal of claim 7, wherein the processor being configured to determine the distance of the to-be-photographed object according to the distance from the image point to the center of the photosensitive device of each of the two photographing modules, the distance between the centers of the lenses of the two photographing modules, and the incident angle formed by the light and the photosensitive device of each of the two photographing modules is configured to obtain the distance of the to-be-photographed object according to a following equation:

$$L''=(d+x2-x1)/[1/tg(\theta 2)-1/tg(\theta 1)];$$

wherein, L" indicates the distance of the to-be-photographed object, d indicates the distance between the centers of the lenses of the two photographing modules, each of x2 and x1 indicates the distance from one of the image points to the center of the photosensitive device for forming the one of the image points, and each of $\theta 2$ and $\theta 1$ indicates an incident angle formed by a light and the photosensitive device of one of the two photographing modules, the light is formed when a light from the point arrives the photosensitive device of the one of the two photographing modules after transmitting through the center of the lens of the one of the two photographing modules.

* * * * *